(12) United States Patent
Konagai et al.

(10) Patent No.: US 11,072,066 B2
(45) Date of Patent: Jul. 27, 2021

(54) WORKING DEVICE USING PARALLEL LINK MECHANISM

(71) Applicant: NTN CORPORATION, Osaka (JP)

(72) Inventors: Naoya Konagai, Iwata (JP); Hiroshi Isobe, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/204,777

(22) Filed: Nov. 29, 2018

(65) Prior Publication Data

US 2019/0152046 A1    May 23, 2019

Related U.S. Application Data

(63) Continuation of application No. PCT/JP2017/019196, filed on May 23, 2017.

(30) Foreign Application Priority Data

May 30, 2016  (JP) .............................. JP2016-107198

(51) Int. Cl.
    *B25J 9/00*    (2006.01)
    *B25J 11/00*   (2006.01)
    (Continued)

(52) U.S. Cl.
    CPC ............... *B25J 9/003* (2013.01); *B25J 11/00* (2013.01); *B25J 15/0019* (2013.01); *F16H 21/48* (2013.01); *F16H 21/54* (2013.01)

(58) Field of Classification Search
    CPC ........ B25J 9/003; B25J 11/00; B25J 15/0019; F16H 21/48; F16H 21/54
    See application file for complete search history.

(56) References Cited

U.S. PATENT DOCUMENTS

| 5,893,296 A | 4/1999 | Rosheim |
| 9,855,621 B2 | 1/2018 | Isobe et al. |

(Continued)

FOREIGN PATENT DOCUMENTS

| CN | 101508109 | 8/2009 |
| CN | 104275568 | 1/2015 |

(Continued)

OTHER PUBLICATIONS

English Translation by WIPO of the International Preliminary Report on Patentability dated Dec. 13, 2018 in corresponding International Patent Application No. PCT/JP2017/019196, 8 pages.

(Continued)

*Primary Examiner* — Zakaria Elahmadi

(57) ABSTRACT

A working device (1) using a parallel link mechanism includes: a parallel link mechanism (10) by which end effectors (4, 5) are supported so as to be changeable in posture; and posture-controlling actuators (11) which actuate the parallel link mechanism (10). In the parallel link mechanism (10), a distal-end-side link hub (13) is connected to a proximal-end-side link hub (12) via three or more link mechanisms (14) so as to be changeable in posture of the distal-end-side link hub (13) relative to the proximal-end-side link hub (12). The end effectors (4, 5) are mounted to the distal-end-side link hub (12), and includes one main end effector (4) which performs a main work on a workpiece (3) and one or multiple sub end effectors (5) which perform an auxiliary work on the workpiece (3).

7 Claims, 13 Drawing Sheets

(51) Int. Cl.
    *F16H 21/48*      (2006.01)
    *B25J 15/00*      (2006.01)
    *F16H 21/54*      (2006.01)

(56) References Cited

U.S. PATENT DOCUMENTS

| | | | |
|---|---|---|---|
| 9,895,766 | B2 | 2/2018 | Ryu |
| 10,946,527 | B2 | 3/2021 | Pidan et al. |
| 2010/0089878 | A1 | 4/2010 | Halser |
| 2010/0327014 | A1* | 12/2010 | Jonas .................. H01L 24/27 427/58 |
| 2015/0001186 | A1 | 1/2015 | Ryu |
| 2015/0108202 | A1 | 4/2015 | Deng et al. |
| 2016/0256952 | A1 | 9/2016 | Isobe et al. |
| 2016/0256998 | A1* | 9/2016 | Isobe ................. B05B 13/0431 |
| 2017/0232618 | A1 | 8/2017 | Pidan et al. |
| 2017/0363148 | A1* | 12/2017 | Akanuma ............. F16C 43/06 |

FOREIGN PATENT DOCUMENTS

| | | | |
|---|---|---|---|
| DE | 10 2008 058 644 | | 4/2010 |
| EP | 0987087 A2 | | 3/2000 |
| JP | 3-126586 | | 12/1991 |
| JP | 6-79472 | | 3/1994 |
| JP | 2000-94245 | | 4/2000 |
| JP | 2002-120093 | | 4/2002 |
| JP | 2009-233680 | | 10/2009 |
| JP | 2010-253538 | | 11/2010 |
| JP | 2011-528979 | | 12/2011 |
| JP | 2013-240805 | | 12/2013 |
| JP | 2014-208353 | | 11/2014 |
| JP | 2015-85411 | | 5/2015 |
| JP | 2015-91615 | | 5/2015 |
| JP | 2015-100802 | | 6/2015 |
| JP | 2015-188945 | | 11/2015 |
| JP | 2015188945 A * | 11/2015 | .............. B23K 9/12 |
| JP | 2016-56932 | | 4/2016 |
| WO | WO2009115792 A1 | | 9/2009 |
| WO | WO 2011/093703 | | 8/2011 |
| WO | WO-2015076201 A1 * | 5/2015 | ......... B05B 13/0431 |
| WO | 2016/001235 | | 1/2016 |

OTHER PUBLICATIONS

Decision of Refusal, dated Apr. 7, 2020, in corresponding Japanese Application No. 2016-107198 (8 pp.).
Notice of Reasons for Refusal, dated Nov. 26, 2019, in Japanese Application No. 2016-107198 (8 pp.).
Extended European Search Report, dated Dec. 10, 2019, in European Application No. 17806460.6 (7 pp.).
International Search Report dated Aug. 8, 2017 in corresponding International Application No. PCT/JP2017/019196.
Decision to Grant a Patent, dated Sep. 1, 2020, in corresponding Japanese Application No. 2016-107198 (5 pp.).
Chinese Office Action dated Apr. 26, 2021, in Chinese Patent Application No. 201780033324.7 (15 pages including translation).

* cited by examiner

WORKING DEVICE USING PARALLEL LINK MECHANISM

CROSS REFERENCE TO THE RELATED APPLICATION

This application is a continuation application, under 35 U.S.C. § 111(a) of international patent application No. PCT/JP2017/019196, filed May 23, 2017, which claims priority to Japanese patent application No. 2016-107198, filed May 30, 2016, the entire disclosure of which is herein incorporated by reference as a part of this application.

BACKGROUND OF THE INVENTION

Field of the Invention

The present invention relates to a working apparatus or working device using a parallel link mechanism, which can perform a work such as welding or coating with high accuracy at high speed, and can alone perform a plurality of works while appropriately switching the works.

Description of Related Art

Working device for automatically performing works have been used in various industrial fields. As an example of the working device for automatically performing works, an automatic welding machine using an articulated robot is disclosed in each of Patent Documents 1, 2, and 3. A parallel link mechanism and a link actuation device, which are used for a working device for automatically performing a work, are described in each of Patent Documents 4 and 5. In addition, an automatic welding machine, using a parallel link mechanism having basically the same configuration as that of the parallel link mechanism of Patent Document 5, is described in Patent Document 6.

RELATED DOCUMENT

Patent Document

[Patent Document 1] JP Laid-open Patent Publication No. H06-079472
[Patent Document 2] JP Laid-open Patent Publication No. 2002-120093
[Patent Document 3] JP Laid-open Patent Publication No. 2010-253538
[Patent Document 4] JP Laid-open Patent Publication No. 2000-094245
[Patent Document 5] U.S. Pat. No. 5,893,296
[Patent Document 6] JP Laid-open Patent Publication No. 2015-100802

With a working device using an articulated robot such as the automatic welding machine described in, for example, each of Patent Documents 1, 2, and 3, a wide work range can be obtained, but a robot body is increased in size. Thus, considering an operation range and the like, a large occupation space is required for installing such a working device. In addition, the articulated robot is composed of a plurality of shafts, and thus, cannot perform a delicate operation at high speed, and an accurate work is difficult to be performed.

If the parallel link mechanism described in each of Patent Documents 4 and 5 is used instead of the articulated robot, the occupation space can be made relatively small, and a delicate operation can be performed at high speed.

However, although the parallel link mechanism of Patent Document 4 has a relatively simple configuration, the operating angle of each link thereof is small. Thus, when the operating range of a traveling plate is set to be large, this parallel link mechanism has an increased link length. Therefore, a problem arises that the dimension of the entire mechanism is increased, resulting in an increased size of the apparatus. In addition, another problem arises that the entire mechanism has a low rigidity and the weight of a tool to be mounted on the traveling plate, i.e., the weight capacity of the traveling plate is limited to a small value.

On the other hand, the parallel link mechanism of Patent Document 5 has a configuration in which a distal-end-side link hub is connected to a proximal-end-side link hub via three or more quadric chain link mechanisms, so that the posture of the distal-end-side link hub relative to the proximal-end-side link hub can be changed. Thus this parallel link mechanism is compact but can perform a motion over a wide operating range with high accuracy at high speed.

Therefore, the automatic welding machine of Patent Document 6, using a parallel link mechanism having basically the same configuration as that of the parallel link mechanism of Patent Document 5, can perform welding over a wide range with high accuracy at high speed. However, the automatic welding machine of Patent Document 6 has a configuration in which only a welding torch is mounted to a single parallel link mechanism, and thus, other works associated with the welding, e.g., heating works to be performed before and after the welding, need to be performed by other working device. Therefore, a workpiece has to be transported between the working device for heating works and the automatic welding machine, whereby a problem arises that working efficiency is low and the temperature of the workpiece decreases during the transport. In also each of well-known working device other than such an automatic welding machine using the parallel link mechanism, only one end effector is mounted to a single parallel link mechanism, and thus the same problem as that in the case of the above-described automatic welding machine arises.

SUMMARY OF THE INVENTION

An object of the present invention is to provide a working device using a parallel link mechanism, which can alone perform a plurality of works with high accuracy at high speed, and enables an efficient work.

A working device using a parallel link mechanism according to the present invention performs a work on a workpiece with use of end effectors, the working device including: a parallel link mechanism by which the end effectors are supported so as to be changeable in posture; and posture-controlling actuators configured to actuate the parallel link mechanism.

The parallel link mechanism includes: a proximal-end-side link hub; a distal-end-side link hub; and three or more link mechanisms which are disposed between the proximal-end-side link hub and the distal-end-side link hub, and by which the distal-end-side link hub is connected to the proximal-end-side link hub so that the posture of the distal-end-side link hub relative to the proximal-end-side link hub can be changed.

Each link mechanism includes: a proximal-side end link member having one end rotatably connected to the proximal-end-side link hub; a distal-side end link member having one end rotatably connected to the distal-end-side link hub; and a center link member having opposite ends rotatably connected to other ends of the proximal-side and distal-side end link members, respectively. The posture-controlling actuators are provided to two or more link mechanisms among the three or more link mechanisms, the posture-controlling actuators being configured to arbitrarily change the posture of the distal-end-side link hub relative to the proximal-end-side link hub. The end effectors are mounted to the distal-end-side link hub, and includes one main end effector configured to perform a main work on the workpiece and one or a plurality of sub end effectors configured to perform an auxiliary work on the workpiece.

In this configuration, since the main end effector and each sub end effector are mounted to the distal-end-side link hub of the parallel link mechanism, this working device alone enables both of the main work to be performed by the main end effector, and the auxiliary work to be performed by the sub end effector.

The parallel link mechanism includes the proximal-end-side link hub, the distal-end-side link hub, and the three or more link mechanisms, thereby forming a mechanism having two degrees of freedom in which the distal-end-side link hub is rotatable relative to the proximal-end-side link hub about orthogonal two axes. The mechanism having two degrees of freedom is compact but provides a wide range of possible movement of the distal-end-side link hub. For example, the maximum value of a bend angle formed by an axis of the proximal-end-side link hub and an axis of the distal-end-side link hub is approximately ±90°. An angle of traverse of the distal-end-side link hub relative to the proximal-end-side link hub can be set to the range of 0° to 360°. By using the parallel link mechanism having a wide range of possible movement and capable of smooth motion as described above, a delicate work can be performed at high speed.

In the present invention, the main end effector and each sub end effector may be mounted to the distal-end-side link hub, such that an axis of a distal end of the main end effector intersects with an axis of a distal end of each sub end effector at an arbitrary degree angle. With this configuration, switching between a state where a work is performed by the main end effector and a state where a work is performed by the sub end effector, can be performed with only the motion of the parallel link mechanism.

It is noted that a point, at which an axis of a revolute pair between the proximal-end-side link hub and each proximal-side end link member intersects with an axis of a revolute pair between the proximal-side end link member and the corresponding center link member, is referred to as a proximal-end-side spherical link center, and a straight line that passes the proximal-end-side spherical link center and that intersects, at a right angle, with the axis of the revolute pair between the proximal-end-side link hub and the proximal-side end link member, is referred to as an axis of the proximal-end-side link hub. In the present invention, each of the main end effector and the sub end effector may be mounted to the distal-end-side link hub, such that an axis of a distal end of each end effector coincides with the axis of the proximal-end-side link hub in a state where the distal-end-side link hub has a predetermined posture relative to the proximal-end-side link hub. With this configuration, just by operating the parallel link mechanism, a direction of a work to be performed by the main end effector and a direction of a work to be performed by the sub end effector, can be made the same as each other. Accordingly, swift switching of works is enabled, and the working efficiency is improved.

A point, at which an axis of a revolute pair between the distal-end-side link hub and each distal-side end link member intersects with an axis of a revolute pair between the distal-side end link member and the corresponding center link member, is referred to as a distal-end-side spherical link center, and a straight line that passes the distal-end-side spherical link center and that intersects, at the right angle, with the axis of the revolute pair between the distal-end-side link hub and the distal-side end link member, is referred to as an axis of the distal-end-side link hub. In the present invention, the axis of the distal end of the main end effector may coincide with the axis of the distal-end-side link hub. With this configuration, the range of possible movement of the main end effector coincides with the operating range of the parallel link mechanism, and thus, the range of possible movement of the main end effector is maximized. In this case, the range of possible movement of the sub end effector is limited to some extent. Thus, an advantageous effect is obtained in a case where the main end effector performs a work on a workpiece while the main end effector is tilted relative to the workpiece and where the sub end effector performs a work on the workpiece while the sub end effector is kept its posture perpendicular to the workpiece.

In the present invention, a distance from the proximal-end-side spherical link center to the distal end of the sub end effector, in a state where the axis of the distal end of the sub end effector and the axis of the proximal-end-side link hub coincide with each other, may be equal to or shorter than a distance from the proximal-end-side spherical link center to the distal end of the main end effector in a state where the axis of the proximal-end-side link hub and the axis of the distal-end-side link hub coincide with each other. Regarding the main end effector for performing a main work, a worker sufficiently understands at what position the distal end of the main end effector is present correspondingly to the posture of the parallel link mechanism. However, regarding the sub end effector for performing an auxiliary work, a worker sometimes does not understand well the position of the distal end of the sub end effector. With the above-described configuration, the distal end of the sub end effector does not project further toward a work plane than the distal end of the main end effector regardless of the posture of the parallel link mechanism. Accordingly, it is possible to reduce a possibility that the sub end effector interferes with the work plane.

In the present invention, the proximal-end-side link hub may be mounted to a linear motion mechanism including a linear motion actuator with one or more axes. With this configuration, by linearly moving the main end effector and the sub end effector together with the parallel link mechanism by the linear motion mechanism, switching between a work to be performed by the main end effector and a work to be performed by the sub end effector can be performed while the angle formed by the main end effector and the sub end effector remains unchanged.

In the present invention, the main end effector may be a welding torch, and the sub end effector may be a heating device. With this configuration, the following operations can be performed: in order to inhibit rapid change in the temperature of a workpiece from occurring between before and after welding, the heating device performs heating before welding; the welding torch performs welding; and the heating device performs heating after the welding. In this case, switching between the heating device and the welding torch can be swiftly performed through only the motion of the parallel link mechanism, whereby reduction in the temperature at the time of the switching can be prevented, and efficient heating can be achieved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
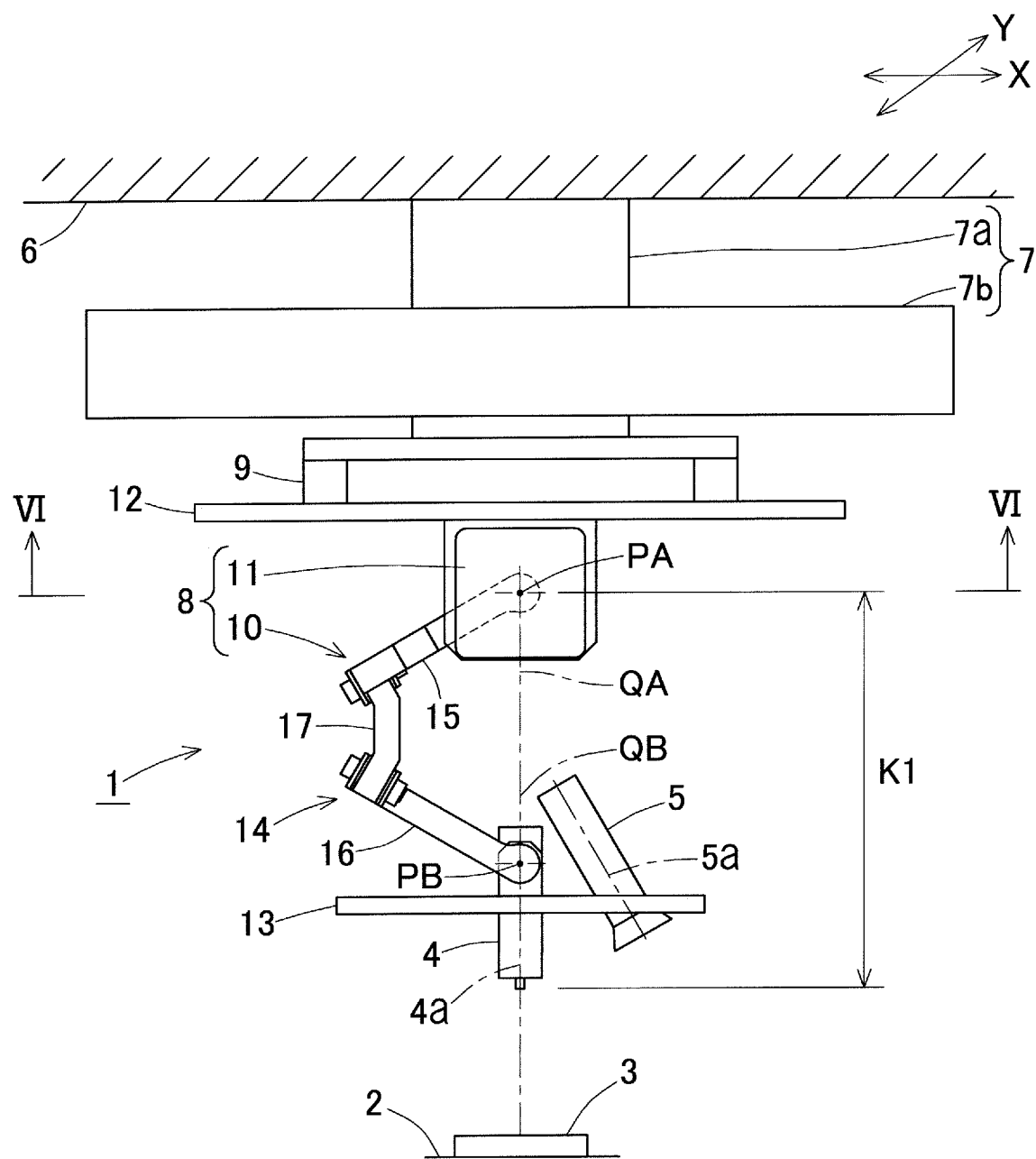
FIG. 1 is a front view of a working device using a parallel link mechanism according to a first embodiment of the present invention in one state, with a portion thereof being omitted.
Figure 2:
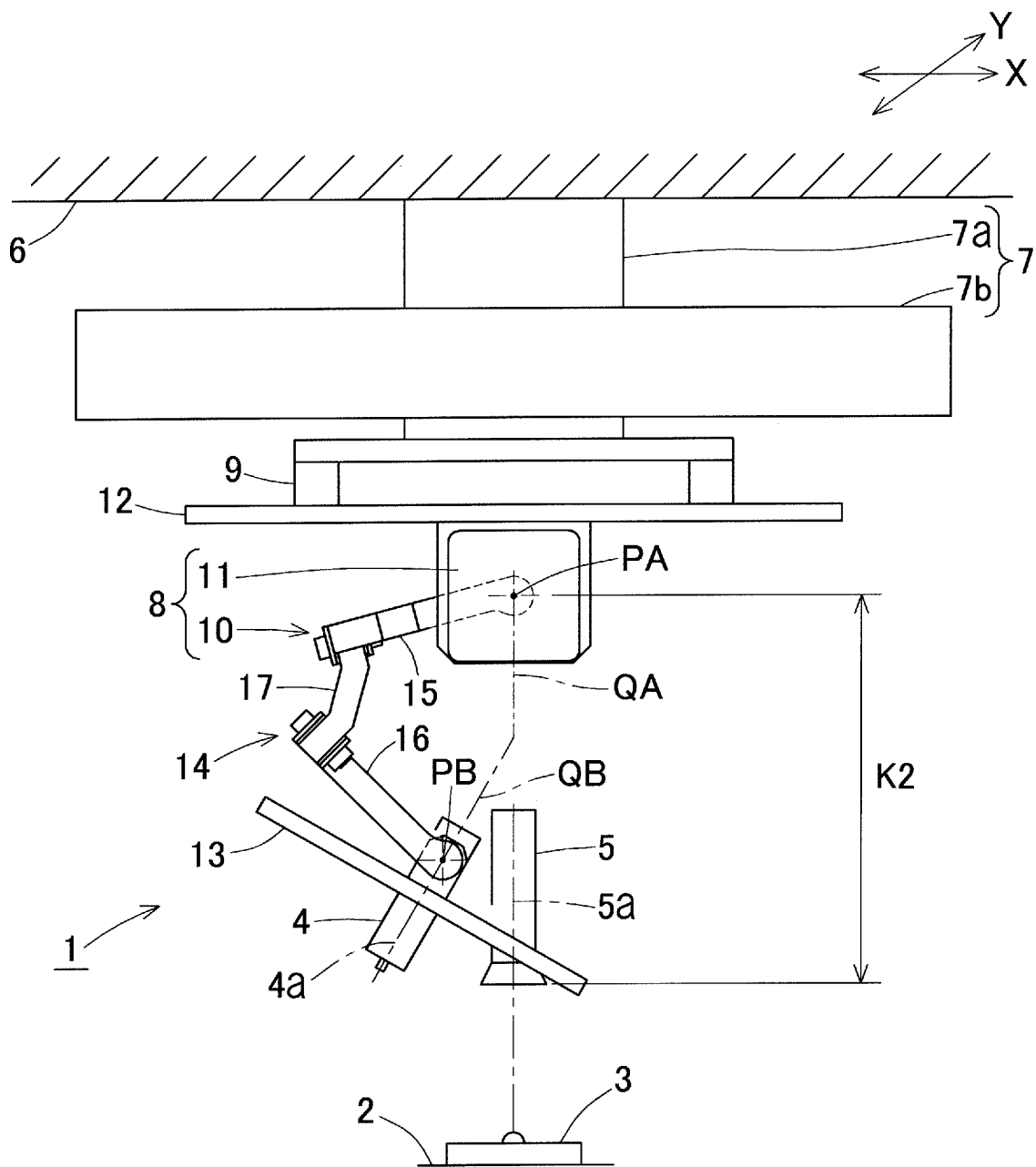
FIG. 2 is a front view of the working device in another state, with a portion thereof being omitted.

A working apparatus or working device using a parallel link mechanism according to a first embodiment of the present invention will be described with reference to FIG. 1 to FIG. 7. FIG. 1 and FIG. 2 are front views of the working device in states that are different from each other. A working device 1 performs, by means of a plurality of end effectors 4 and 5, a plurality of types of works on a workpiece 3 placed on a floor surface 2 or a workpiece placement stage (not shown). The working device 1 includes: a linear motion mechanism 7 with orthogonal two axes disposed on a support member 6 such as a mount; and a link actuation device 8 provided to the linear motion mechanism 7 so as to protrude downward from the linear motion mechanism 7.

The linear motion mechanism 7 includes a Y-axis linear motion actuator 7a which advances/retreats in a front/rear direction (Y-axis direction) that is perpendicular to the sheet surface of drawing, and an X-axis linear motion actuator 7b which advances/retreats in a left/right direction (X-axis direction) on the sheet surface of the drawing. A fixation portion of the Y-axis linear motion actuator 7a is fixed to the support member 6, and a proximal-end-side link hub 12, which is described later, of the link actuation device 8 is mounted to an advancing/retreating portion of the X-axis linear motion actuator 7b via a mounting member 9. The linear motion mechanism 7 may be composed of only a linear motion actuator with one axis, or may be composed of linear motion actuators with three or more axes.

The link actuation device 8 includes: a parallel link mechanism 10 by which the end effectors 4 and 5 are supported so as to be changeable in posture; and posture-controlling actuators 11 which actuate the parallel link mechanism 10. In the parallel link mechanism 10, a distal-end-side link hub 13 is connected to the proximal-end-side link hub 12 via link mechanisms 14, so that a posture of the distal-end-side link hub 13 can be changed relative to the proximal-end-side link hub 12. The end effectors 4 and 5 are mounted to the distal-end-side link hub 13. In an example shown in FIG. 1 and FIG. 2, the proximal-end-side link hub 12 is disposed on the upper side, but the distal-end-side link hub 13 may be disposed on the upper side. In either of the cases, the proximal-end-side link hub 12 is mounted to the linear motion mechanism 7.

The plurality of end effectors includes: one main end effector 4 which performs a main work on a workpiece 3; and a sub end effector 5 which performs an auxiliary work on the workpiece 3. In the example shown in the drawings, the number of the sub end effector 5 is one, but the number of the sub end effector 5 may be two or more. In the following description, the main end effector 4 and the sub end effector 5 are sometimes collectively referred to as the end effectors 4 and 5.

Examples of the combination of the main end effector 4 and the sub end effector 5 are described as follows.

In a case where an ink-coating machine, an adhesive-applying machine, or a resin material-applying machine is used as the main end effector 4, either or both of a drying machine and a cooling device are used as the sub end effectors 5.

In a case where a welding machine is used as the main end effector 4, a heating device is used as the sub end effector 5.

In a case where a grease-applying machine or a bolt runner is used as the main end effector 4, an appearance inspection device such as a camera is used as the sub end effector 5.

Figure 3:
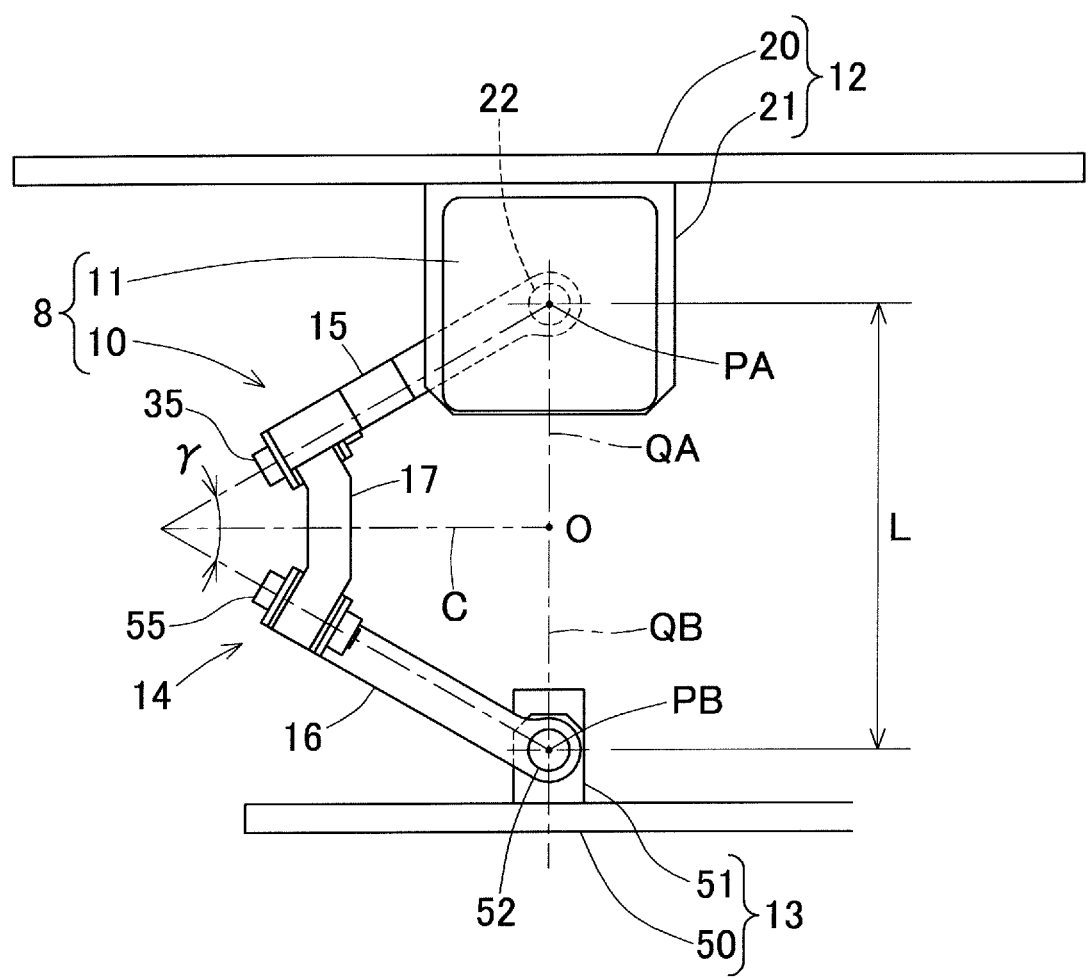
FIG. 3 is a front view of a link actuation device of the working device, with a portion thereof being omitted.
Figure 4:
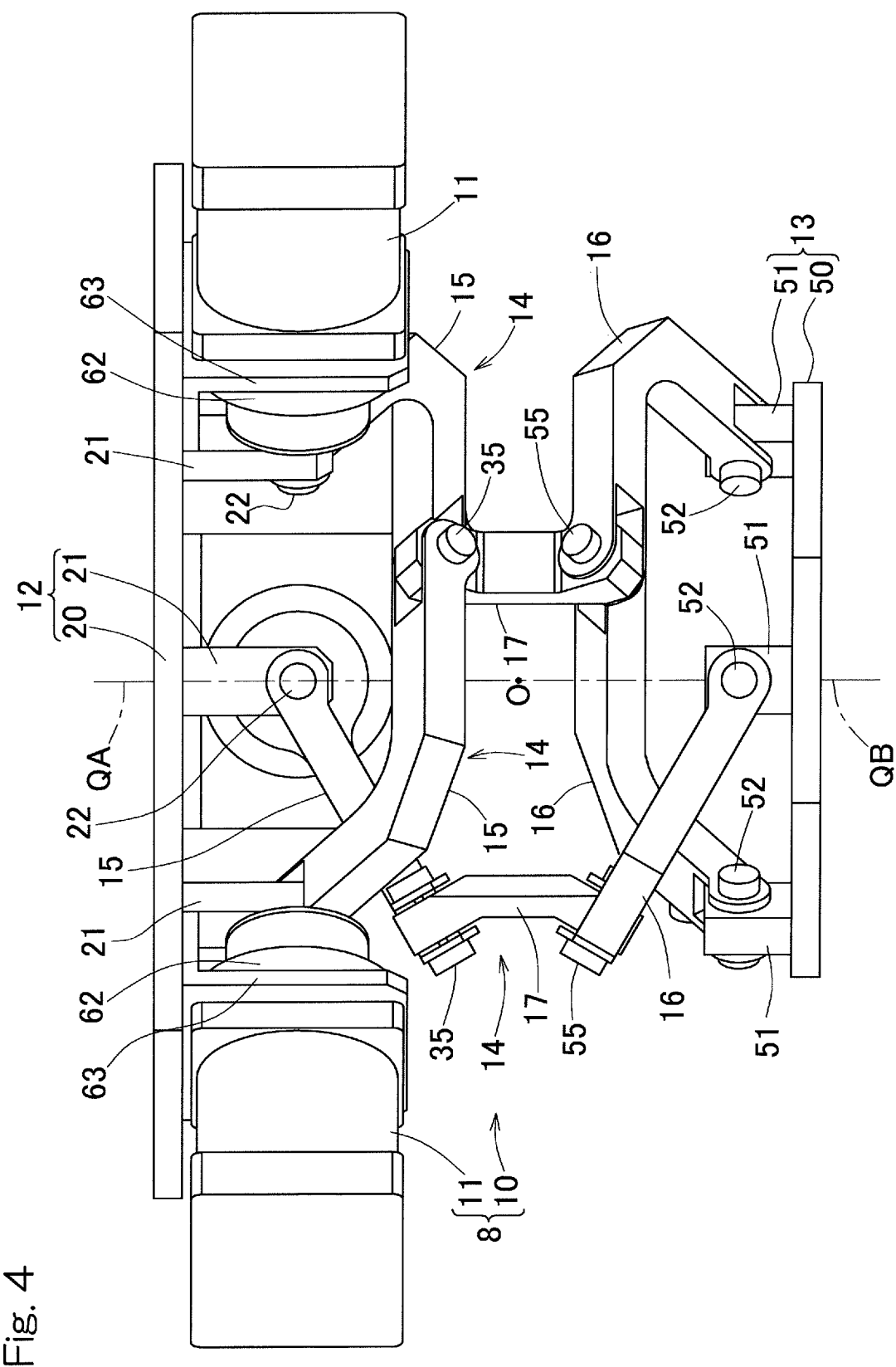
FIG. 4 is a perspective view of the link actuation device in one state.
Figure 5:
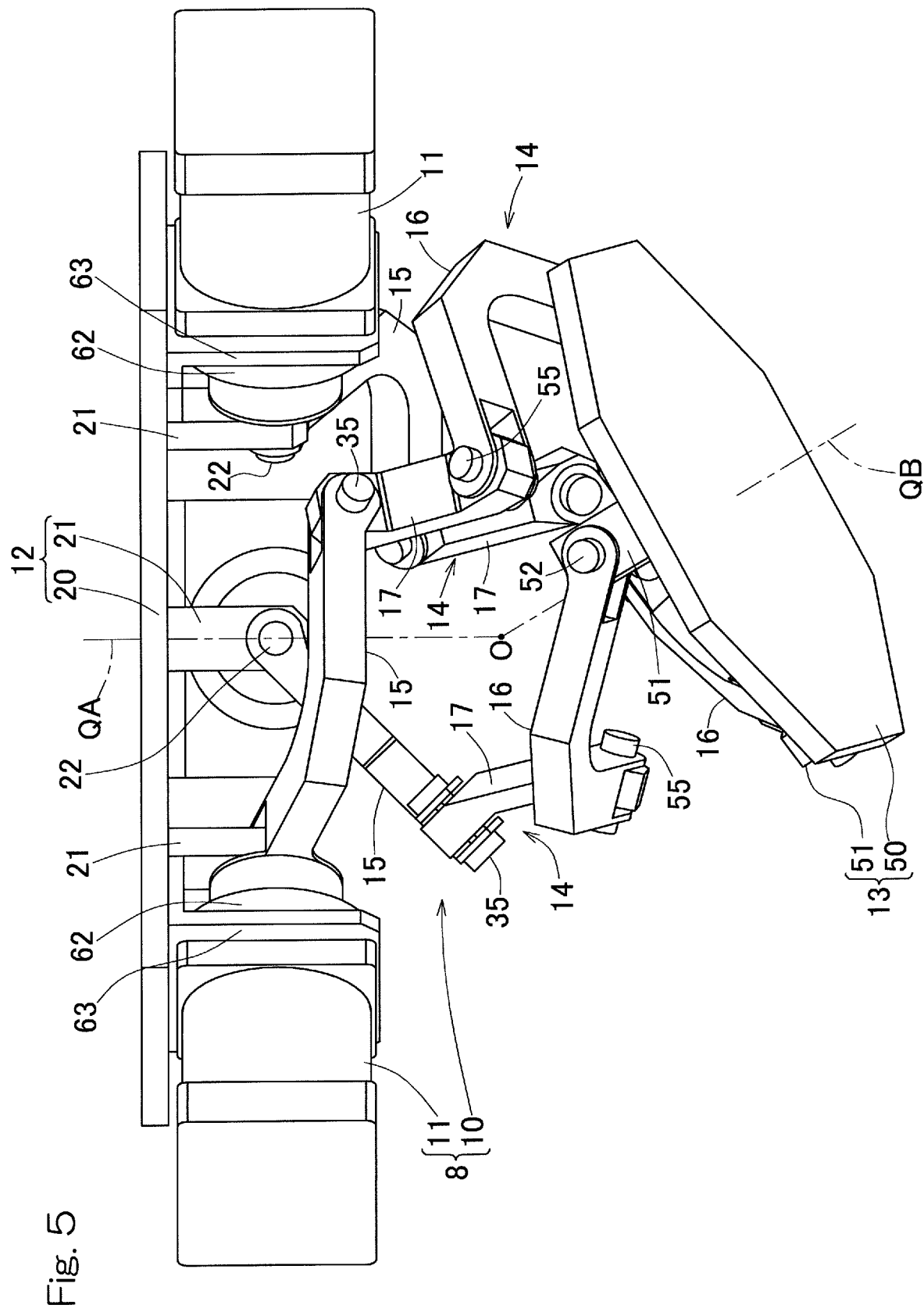
FIG. 5 is a perspective view of the link actuation device in another state.

The link actuation device 8 will be described in details. FIG. 3 is a front view of the link actuation device 8, and FIG. 4 and FIG. 5 are perspective views of the link actuation device 8 in states that are different from each other. In the parallel link mechanism 10 of the link actuation device 8, the distal-end-side link hub 13 is connected to the proximal-end-side link hub 12 via three link mechanisms 14, so that the posture of the distal-end-side link hub 13 can be changed relative to the proximal-end-side link hub 12. FIG. 3 shows only one of the link mechanisms 14. The number of the link mechanisms 14 may be four or more.

Each link mechanism 14 includes: a proximal-side end link member 15; a distal-side end link member 16; and a center link member 17, to form a quadric chain link mechanism including four revolute pairs. Each of the proximal-side and distal-side end link members 15 and 16 is L-shaped. One end of the proximal-side end link member 15 is rotatably connected to the proximal-end-side link hub 12, and one end of the distal-side end link member 16 is rotatably connected to the distal-end-side link hub 13. The center link member 17 has opposite ends to which the other ends of the proximal-side and distal-side end link members 15 and 16 are rotatably connected, respectively.

The parallel link mechanism 10 has a structure obtained by combining two spherical link mechanisms. Axes or center lines of respective revolute pairs between the proximal-end-side link hub 12 and the proximal-side end link member 15, and axes of respective revolute pairs between the proximal-side end link member 15 and the center link member 17, intersect with each other at a proximal end side spherical link center PA (FIG. 3). Axes or center lines of respective revolute pairs between the distal-end-side link hub 13 and the distal-side end link member 16, and axes of respective revolute pairs between the distal-side end link member 16 and the center link member 17, intersect with each other at a distal end side spherical link center PB (FIG. 3). On the proximal end side and the distal end side, the distances from the respective spherical link centers PA, PB to the respective revolute pairs between the link hubs 12, 13 and the end link members 15, 16 are equal to one another, and the distances from the respective spherical link centers PA, PB to the respective revolute pairs between the end link members 15, 16 and the center link members 17 are also equal to one another. The axes of the respective revolute pairs between the end link members 15, 16 and the center link member 17 may form a certain intersection angle γ (FIG. 3) therebetween, or may be parallel to each other.

Figure 6A:
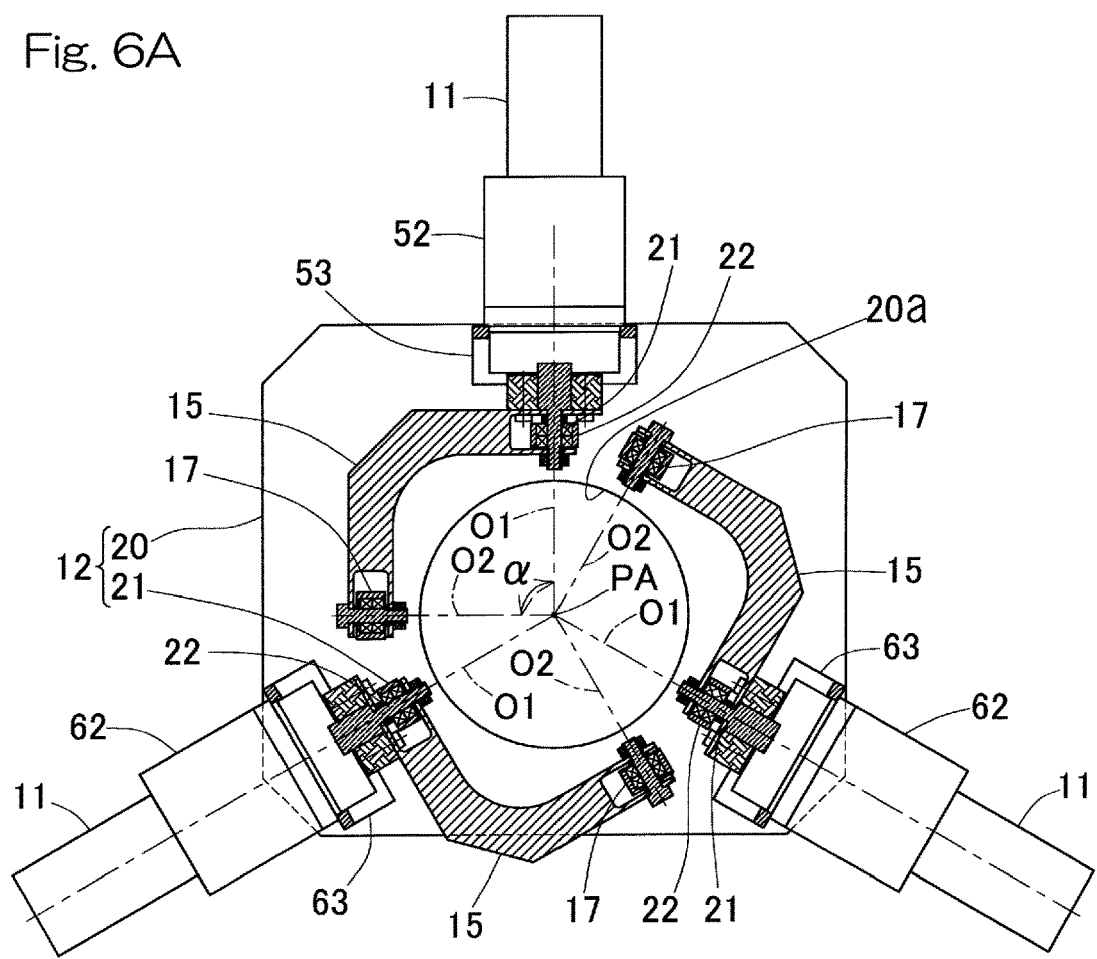
FIG. 6A is a cross-sectional view taken along a line VI-VI in FIG. 1.

FIG. 6A is a cross-sectional view taken along a line VI-VI in FIG. 1, and shows the relationship among: axes O1 of the respective revolute pairs between the proximal-end-side link hub 12 and the proximal-side end link members 15; axes O2 of the respective revolute pairs between the center link members 17 and the proximal-side end link members 15; and the proximal-end-side spherical link center PA. As shown in FIG. 6A, a point at which each axis or center line O1 and each axis or center line O2 intersect with each other is the spherical link center PA. The positional relationship and the shapes of the distal-end-side link hub 13 and the distal-side end link members 16 are the same (not shown) as those in FIGS. 6A and 6B. In the shown example, an angle α formed by the axis O1 of the revolute pair between the link hub 12 (13) and the end link member 15 (16) and the axis O2 of the revolute pair between the end link member 15 (16) and the center link member 17, is 90°. However, the angle α may be an angle other than 90°.

Figure 7:
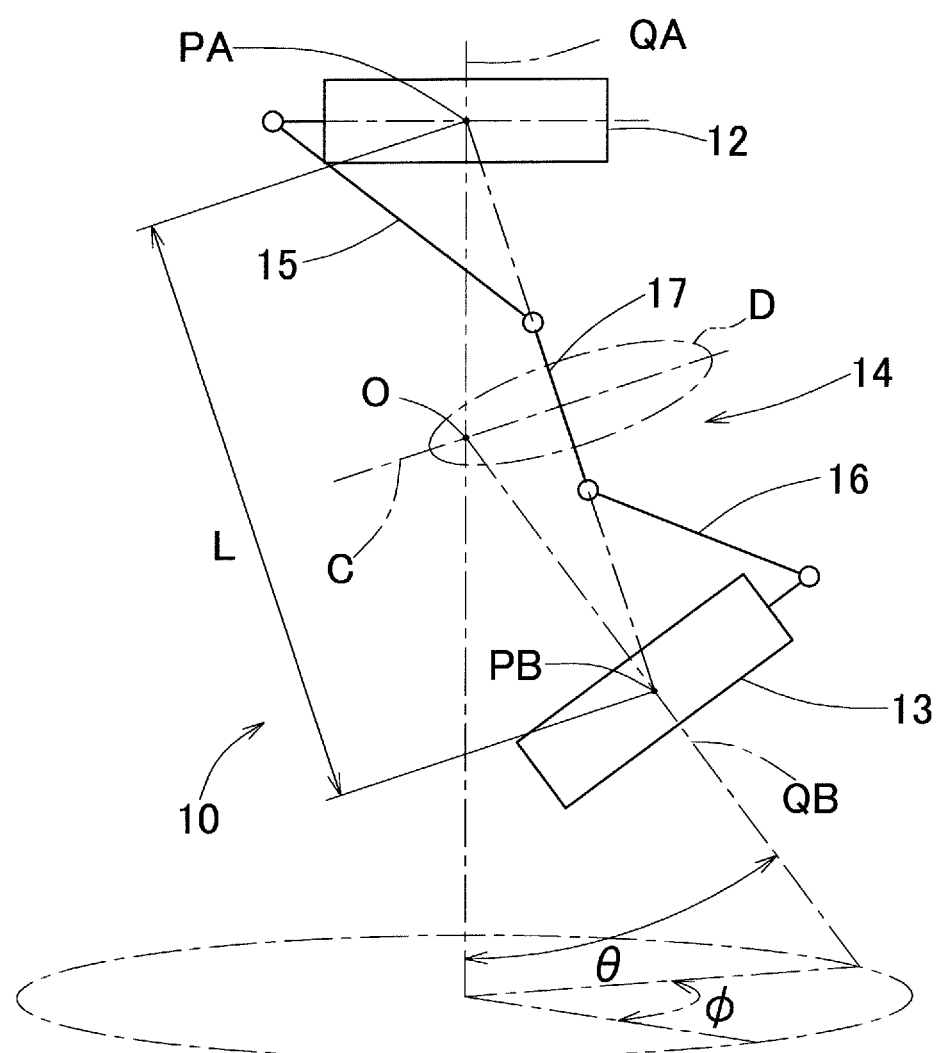
FIG. 7 is a view in which one link mechanism of the link actuation device is depicted with straight lines.

The three link mechanisms 14 have geometrically identical forms. The geometrically identical forms mean that, as shown in FIG. 7, a geometric model depicted with straight lines that represent the link members 15, 16, and 17, i.e., a model depicted with the revolute pairs and straight lines connecting the revolute pairs to each other has such a shape that a proximal-end-side portion and a distal-end-side portion relative to a center portion of the center link member 17 are symmetric with each other. FIG. 7 is a view in which one of the link mechanisms 14 is depicted with straight lines. The parallel link mechanism 10 according to the present embodiment is of a rotation symmetrical type, and has a positional configuration in which a proximal side portion composed of the proximal-end-side link hub 12 and the proximal-side end link member 15 are rotationally symmetric, about a center line C of the center link member 17, with a distal side portion composed of the distal-end-side link hub 13 and the distal-side end link member 16. The center portions of the center link members 17 are located on the same orbital circle D.

The proximal-end-side link hub 12, the distal-end-side link hub 13, and the three link mechanisms 14 cooperate together to form a mechanism having two degrees of freedom, in which the distal-end-side link hub 13 is rotatable, about orthogonal two axes, relative to the proximal-end-side link hub 12. In other words, in the mechanism, the posture of the distal-end-side link hub 13 is changeable relative to the proximal-end-side link hub 12, with two degrees of rotational freedom. This mechanism having two degrees of freedom is compact, but provides a wide range of possible movement of the distal-end-side link hub 13 relative to the proximal-end-side link hub 12.

For example, a case where a straight line that passes the proximal-side-end spherical link center PA and that intersects, at the right angle, with the axis O1 (FIG. 6A) of the revolute pair between the proximal-end-side link hub 12 and the proximal-side end link member 15 is defined as an axis or center line QA of the proximal-end-side link hub 12. Similarly, a case where a straight line that passes the distal-side-end spherical link center PB and that intersects, at the right angle, with the axis O1 (FIG. 6A) of the revolute pair between the distal-end-side link hub 13 and the distal-side end link member 16 is defined as an axis or center line QB of the distal-end-side link hub 13. In this case, the maximum value of a bend angle θ (FIG. 7) formed by the axis QA of the proximal-end-side link hub 12 and the axis QB of the distal-end-side link hub 13 can be set to approximately ±90°. In addition, an angle of traverse φ (FIG. 7) of the distal-end-side link hub 13 relative to the proximal-end-side link hub 12 can be set to the range of 0° to 360°. The bend angle θ refers to a vertical angle formed when the axis QB of the distal-end-side link hub 13 is tilted relative to the axis QA of the proximal-end-side link hub 12. The angle of traverse φ refers to a horizontal angle formed when the axis QB of the distal-end-side link hub 13 is tilted around the axis QA of the proximal-end-side link hub 12.

The posture of the distal-end-side link hub 13 relative to the proximal-end-side link hub 12 is changed with, as a rotation center, an intersection point O of the axis QA of the proximal-end-side link hub 12 and the axis QB of the distal-end-side link hub 13. FIG. 4 shows a state where an origin position is assumed such that the axis QA of the proximal-end-side link hub 12 and the axis QB of the distal-end-side link hub 13 are on the same line. FIG. 5 shows a state where the axis QB of the distal-end-side link hub 13 is tilted at a certain operating angle relative to the axis QA of the proximal-end-side link hub 12. Even if the posture is changed, a distance L (FIG. 3 and FIG. 7) between the proximal-end-side and distal-end-side spherical link centers PA and PB is unchanged.

If the link mechanisms 14 satisfy the following conditions (conditions 1 to 5), the proximal side portion composed of the proximal-end-side link hub 12 and the proximal-side end link members 15, and the distal side portion composed of the distal-end-side link hub 13 and the distal-side end link members 16 move in the same manner owing to geometrical symmetry. Thus, when transmitting rotation from the proximal end side to the distal end side, the parallel link mechanism 10 functions as a constant velocity universal joint that is rotated at a constant velocity with the same rotation angle being formed on the proximal end side and the distal end side.

Condition 1: On the proximal end side and the distal end side, the angles formed by the axes O1 of the revolute pairs between the link hubs 12, 13 and the end link members 15, 16 in the respective link mechanisms 14 are equal to one another, and the lengths of these axes O1 are equal to one another.

Condition 2: On the proximal end side and the distal end side, the axes O1 of the revolute pairs between the link hubs 12, 13 and the end link members 15, 16, and the axes O2 of the revolute pairs between the end link members 15, 16 and the center link member 17, intersect with each other at the spherical link centers PA and PB.

Condition 3: Each proximal-side end link member 15 and each distal-side end link member 16 have geometrically identical forms.

Condition 4: A proximal-end-side portion and a distal-end-side portion of the center link member 17 have geometrically identical forms.

Condition 5: Relative to a symmetry plane of the center link member 17, the angular positional relationships between the center link member 17 and the end link members 15, 16 are the same with each other on the proximal end side and the distal end side.

As shown in FIG. 3 to FIG. 5, the proximal-end-side link hub 12 includes: a proximal-end member 20; and three rotational shaft connection members 21 provided integrally with the proximal-end member 20. As shown in FIG. 6A, the proximal-end member 20 is provided with a circular through hole 20a at a center portion thereof, and the three rotational shaft connection members 21 are arranged around the through hole 20a at equal intervals in the circumferential direction. The center of the through hole 20a is located on the axis QA (FIG. 3) of the proximal-end-side link hub 12. To each rotational shaft connection member 21, a rotation shaft 22 is rotatably connected such that the axis of the rotational shaft 22 intersects with the axis QA of the proximal-end-side link hub 12. The one end of the proximal-side end link member 15 is connected to the rotation shaft 22.

Figure 6B:
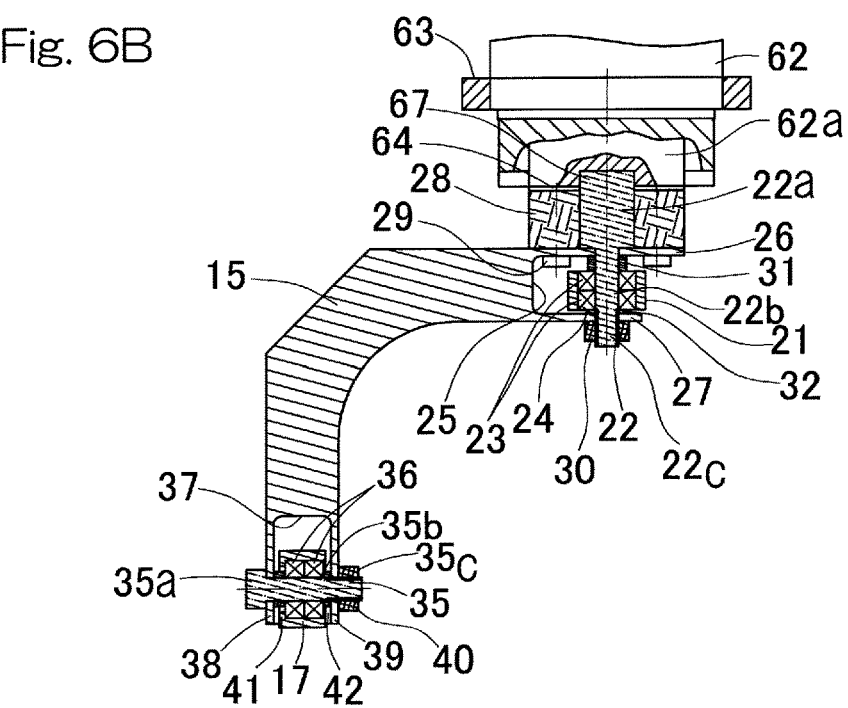
FIG. 6B is a partially enlarged view of the cross-sectional view of FIG. 6A.

FIG. 6B shows one of the proximal-side end link members 15 on a larger scale. As shown in FIG. 6B, the rotation shaft 22 has a large-diameter portion 22a, a small-diameter portion 22b and an external thread portion 22c, and is rotatably supported at the small-diameter portion 22b by the rotational shaft connection member 21 via two bearings 23. As the bearings 23, ball bearings such as deep groove ball bearings or angular contact ball bearings are used, for example. These bearings 23 are disposed, in a fitted state, in an inner-diameter groove 24 formed in the rotational shaft connection member 21, and are fixed by a method such as press-fitting, adhesion or crimping. The types of the bearings provided to the other revolute pair portions, and methods for installing these bearings, are the same as above.

The rotation shaft 22 is disposed such that the large-diameter portion 22a is coaxial with an output shaft 62a of a speed reduction mechanism 62 (described later). The arrangement structure thereof will be described later.

To the rotation shaft 22, the one end of the proximal-side end link member 15 is connected so as to be rotated integrally with the rotation shaft 22. That is, the rotational shaft connection member 21 is disposed in a cut portion 25 formed at the one end of the proximal-side end link member 15. The small-diameter portion 22b of the rotation shaft 22 is inserted in inner rings of the bearings 23 and through holes respectively formed in a pair of inner and outer rotation shaft support portions 26 and 27 which are opposed end portions of the cut portion 25 at the one end of the proximal-side end link member 15. The proximal-side end link member 15 and the output shaft 62a of the speed reduction mechanism 62 are fixed to each other by means of bolts 29 via a spacer 28 press-fitted to the outer periphery of the large-diameter portion 22a of the rotation shaft 22, and a nut 30 is screwed onto the external thread portion 22c, of the rotation shaft 22, which projects from the outer rotation shaft support portion 27. Spacers 31 and 32 are interposed between the inner ring of each bearing 23 and each of the pair of rotation shaft support portions 26 and 27, such that a preload is applied to the bearings 23 when the nut 30 is screwed.

A rotation shaft 35 rotatably connected to one end of the center link member 17 is connected to the other end of the proximal-side end link member 15. Similarly to the rotation shaft 22 of the proximal-end-side link hub 12, the rotation shaft 35 of the center link member 17 has a large-diameter portion 35a, a small-diameter portion 35b, and an external thread portion 35c, and is rotatably supported at the small-diameter portion 35b by the one end of the center link member 17 via two bearings 36. That is, the one end of the center link member 17 is disposed in a cut portion 37 formed at the other end of the proximal-side end link member 15, and the small-diameter portion 35b of the rotation shaft 35 is inserted in inner rings of the bearings 36 and through holes respectively formed in a pair of inner and outer rotation shaft support portions 38 and 39 which are opposed end portions of the cut portion 37 at the other end of the proximal-side end link member 15. A nut 40 is screwed onto the external thread portion 35c, of the rotation shaft 35, which projects from the outer rotation shaft support portion 39. Spacers 41 and 42 are interposed between the inner ring of each bearing 36 and each of the pair of rotation shaft support portions 38 and 39, such that a preload is applied to the bearings 36 when the nut 40 is screwed.

As shown in FIG. 3 to FIG. 5, the distal-end-side link hub 13 includes: a flat-plate-shaped distal end member 50; and three rotational shaft connection members 51 arranged at equal interval in the circumferential direction on the inner surface of the distal end member 50. The center of a circle, along which the three rotational shaft connection members 51 are arranged, is located on the axis QB of the distal-end-side link hub 13. To each rotational shaft connection member 51, a rotation shaft 52 is rotatably connected such that the axis of the rotation shaft 52 intersects with the axis QB of the distal-end-side link hub 13. The one end of the distal-side end link member 16 is connected to the rotation shaft 52 of the distal-end-side link hub 13. To the other end of the distal-side end link member 16, a rotation shaft 55 rotatably connected to the other end of the center link member 17 is connected. The rotation shaft 52 of the distal-end-side link hub 13 and the rotation shaft 55 of the center link member 17 have shapes identical to that of the rotation shaft 35, and are rotatably connected to the rotational shaft connection member 51 and the other end of the center link member 17, respectively, via two bearings (not shown).

As shown in FIG. 4 and FIG. 5, each posture-controlling actuator 11 of the link actuation device 8 is a rotary actuator including the speed reduction mechanism 62, and is disposed on the lower surface of the proximal-end member 20 of the proximal-end-side link hub 12 coaxially with the rotation shaft 22. The posture-controlling actuator 11 and the speed reduction mechanism 62 are provided integrally with each other, and the speed reduction mechanism 62 is fixed to the proximal-end member 20 by a motor fixation member 63. In this example, the posture-controlling actuators 11 are provided to all of the three link mechanisms 14. However, the posture of the distal-end-side link hub 13 relative to that of the proximal-end-side link hub 12 can be determined as long as the posture-controlling actuators 11 are provided to at least two of the three link mechanisms 14.

In FIG. 6B, the speed reduction mechanism 62 is of a flange output type, and includes the output shaft 62a having a large diameter. The distal end surface of the output shaft 62a is formed as a flat flange surface 64 perpendicular to the center line of the output shaft 62a. The output shaft 62a is connected to the rotation shaft support portion 26 of the proximal-side end link member 15 via the spacer 28 by means of the bolts 29. The large-diameter portion 22a of the rotation shaft 22, which forms the revolute pair portion between the proximal-end-side link hub 12 and the proximal-side end link member 15, is fitted in an inner-diameter groove 67 formed in the output shaft 62a of the speed reduction mechanism 62.

In the link actuation device 8, the parallel link mechanism 10 is actuated by rotationally driving each posture-controlling actuator 11. Specifically, when the posture-controlling actuator 11 is rotationally driven, this rotation is transmitted to the rotation shaft 22 while being slowed down via the speed reduction mechanism 62, so that the angle of the proximal-side end link member 15 relative to the proximal-end-side link hub 12 is changed. Accordingly, the position and the posture of the distal-end-side link hub 13 relative to the proximal-end-side link hub 12 are determined.

A mounting position and a mounting posture of the main end effector 4 and the sub end effector 5 relative to the distal-end-side link hub 13 will be described with reference to FIG. 1 and FIG. 2.

The main end effector 4 is mounted such that an axis or center line 4a of the distal end thereof coincides with the axis QB of the distal-end-side link hub 13. When the parallel link mechanism 10 is located at an origin position as in FIG. 1, the axis 4a of the distal end of the main end effector 4 coincides with also the axis QA of the proximal-end-side link hub 12.

The sub end effector 5 is diagonally mounted such that an axis or center line 5a of the distal end thereof is tilted at an angle relative to the axis 4a of the distal end of the main end effector 4. In a state where the parallel link mechanism 10 has a predetermined posture as in FIG. 2, the axis 5a of the distal end of the sub end effector 5 coincides with the axis QA of the proximal-end-side link hub 12.

A distance K2 from the proximal-end-side spherical link center PA to the distal end of the sub end effector 5 in a state where the axis 5a of the distal end of the sub end effector 5 and the axis QA of the proximal-end-side link hub 12 coincide with each other (FIG. 2), is set to be equal to or shorter than a distance K1 from the proximal-end-side spherical link center PA to the distal end of the main end effector 4 (K2≤K1) in a state where the axis QA of the proximal-end-side link hub 12 and the axis QB of the distal-end-side link hub 13 coincide with each other (FIG. 1).

Operations and effects of the working device 1 using this parallel link mechanism will be described below.

(1) The working device 1 performs a work while moving, in the X-axis direction and the Y-axis direction, the end effectors 4 and 5 by means of the linear motion mechanism 7 with orthogonal two axes, and changing the postures of the end effectors 4 and 5 by means of the link actuation device 8. Since the main end effector 4 and the sub end effector 5 are mounted to the distal-end-side link hub 13, the working device 1 alone enables a main work to be performed by the main end effector 4 and an auxiliary work to be performed by the sub end effector 5.

(2) Since the main end effector 4 and the sub end effector 5 are mounted with an angle formed therebetween, switching between a state where a work is performed by the main end effector 4 and a state where a work is performed by the sub end effector 5 can be performed with only the motion of the parallel link mechanism 10.

(3) In a state where the distal-end-side link hub 13 has a predetermined posture relative to the proximal-end-side link hub 12, the axis 4a, 5a of the distal end of the main end effector 4 or the sub end effector 5 coincides with the axis QA of the proximal-end-side link hub 12. Therefore, just by operating the parallel link mechanism 10, a direction of a work to be performed by the main end effector 4 and a direction of a work to be performed by the sub end effector 5 can be made the same as each other. Accordingly, swift switching of works is enabled, and the working efficiency is improved.

(4) Since the axis 4a of the distal end of the main end effector 4 coincides with the axis QB of the distal-end-side link hub 13, the range of possible movement of the main end effector 4 coincides with the operating range of the parallel link mechanism 10, and thus, the range of possible movement of the main end effector 4 is maximized. In this case, the range of possible movement of the sub end effector 5 is limited to some extent. Thus, an advantageous effect is obtained in a case where the main end effector 4 performs a work on a workpiece 3 while the main end effector 4 is tilted relative to the workpiece 3, and where the sub end effector 5 performs a work on the workpiece 3 while the sub end effector 5 perpendicularly opposes to the workpiece 3.

(5) Regarding the main end effector 4 for performing a main work, a worker sufficiently understands at what position the distal end of the main end effector 4 is present correspondingly to the posture of the parallel link mechanism 10. However, regarding the sub end effector 5 for performing an auxiliary work, a worker sometimes does not understand well the position of the distal end of the sub end effector 5. Even in this case, since the positional relationship between the distal ends of the main end effector 4 and the sub end effector 5 satisfies K2≤K1, the distal end of the sub end effector 5 does not project further toward a work plane than the distal end of the main end effector 4 regardless of the posture of the parallel link mechanism 10. Thus, it is possible to reduce a possibility that the sub end effector 5 interferes with the work plane.

(6) Since the linear motion mechanism 7 for moving the link actuation device 8 in orthogonal two axial directions is provided, the main end effector 4 and the sub end effector 5 can be linearly moved together with the parallel link mechanism 10 by the linear motion mechanism 7. Accordingly, switching between a work to be performed by the main end effector 4 and a work to be performed by the sub end effector 5 can be performed while the angle formed by the main end effector 4 and the sub end effector 5 remains unchanged.

Figure 8:
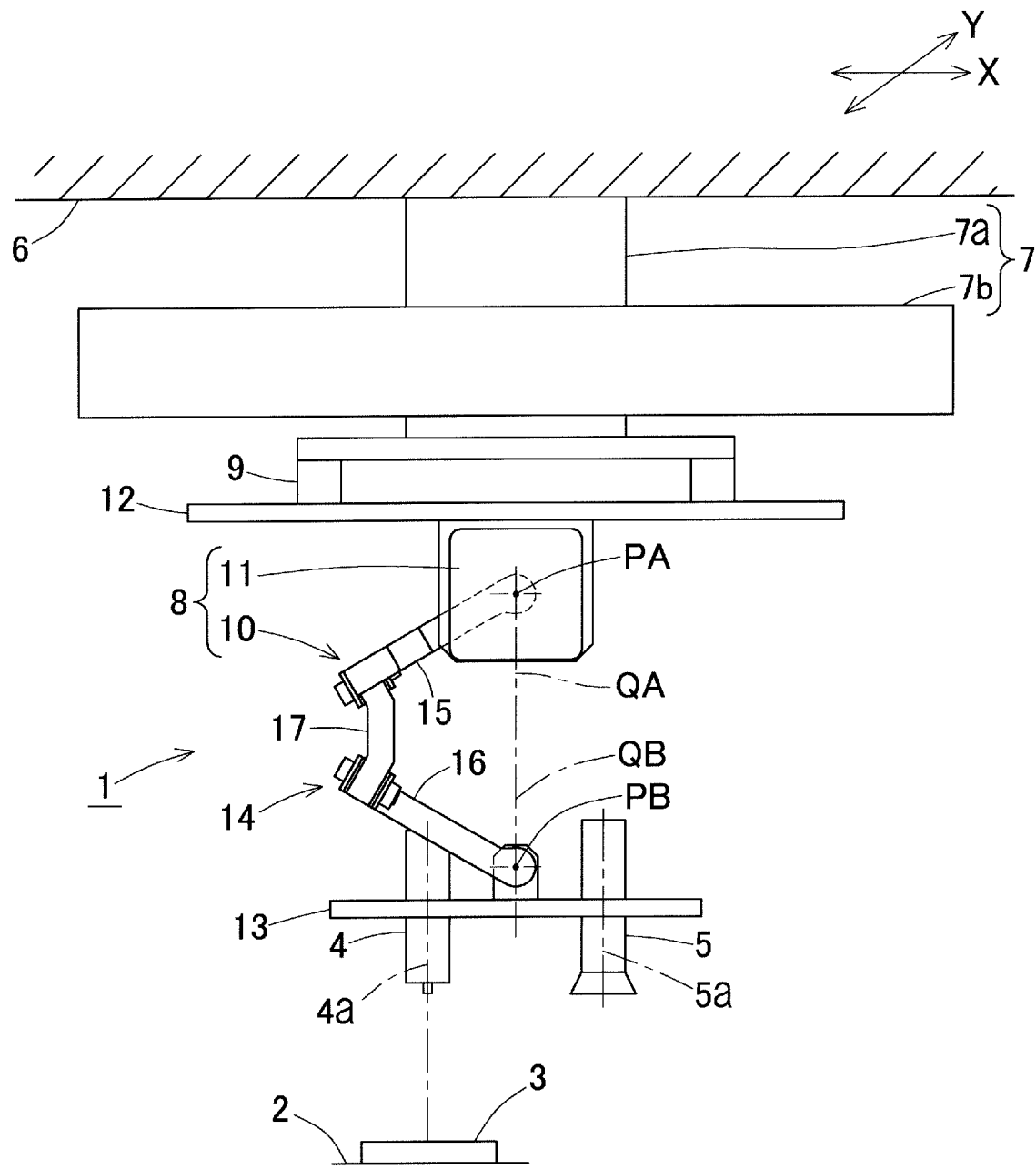
FIG. 8 is a front view of a working device using a parallel link mechanism according to a second embodiment of the present invention, with a portion thereof being omitted.

Hereinafter, other embodiments of the present invention will be described. In a working device 1 according to a second embodiment shown in FIG. 8, the main end effector 4 and the sub end effector 5 are mounted to the distal-end-side link hub 13 such that the axes 4a and 5a of the distal ends thereof are parallel to each other. In addition, the axes 4*a* and 5*a* of the distal ends of the respective end effectors 4 and 5 do not coincide with the axis QB of the distal-end-side link hub 13, and, regardless of the posture of the parallel link mechanism 10, do not coincide with the axis QA of the proximal-end-side link hub 12. The other components are the same as those in the first embodiment shown in FIG. 1 and FIG. 2. With this configuration, the operations and effects as in the above-described (1) and (6) are obtained, but the other operations and effects are not obtained.

Figure 9:
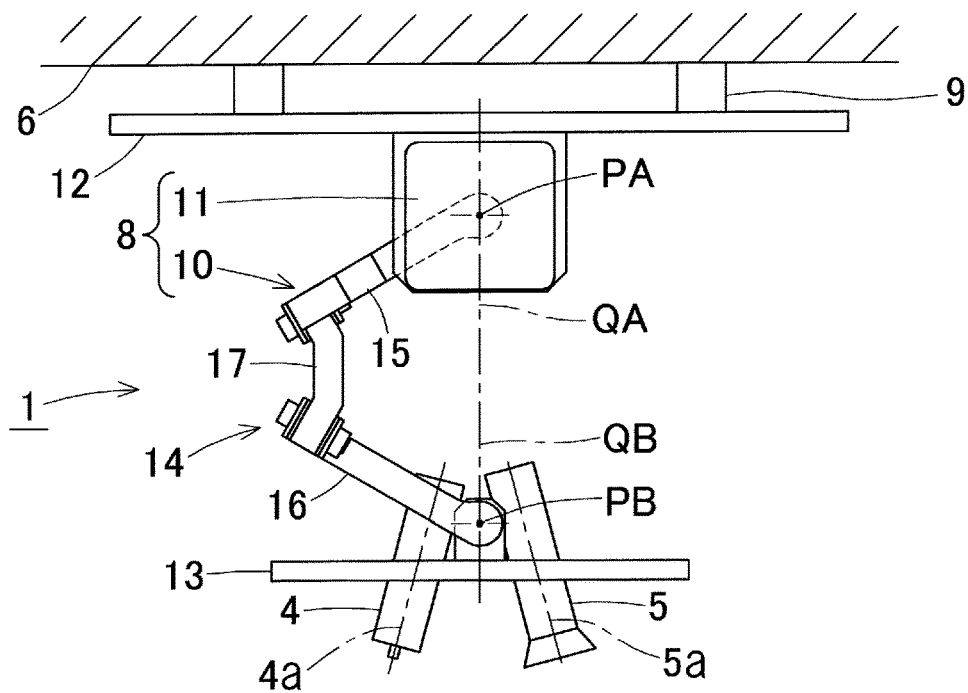
FIG. 9 is a front view of a working device using a parallel link mechanism according to a third embodiment of the present invention in one state, with a portion thereof being omitted.
Figure 10:
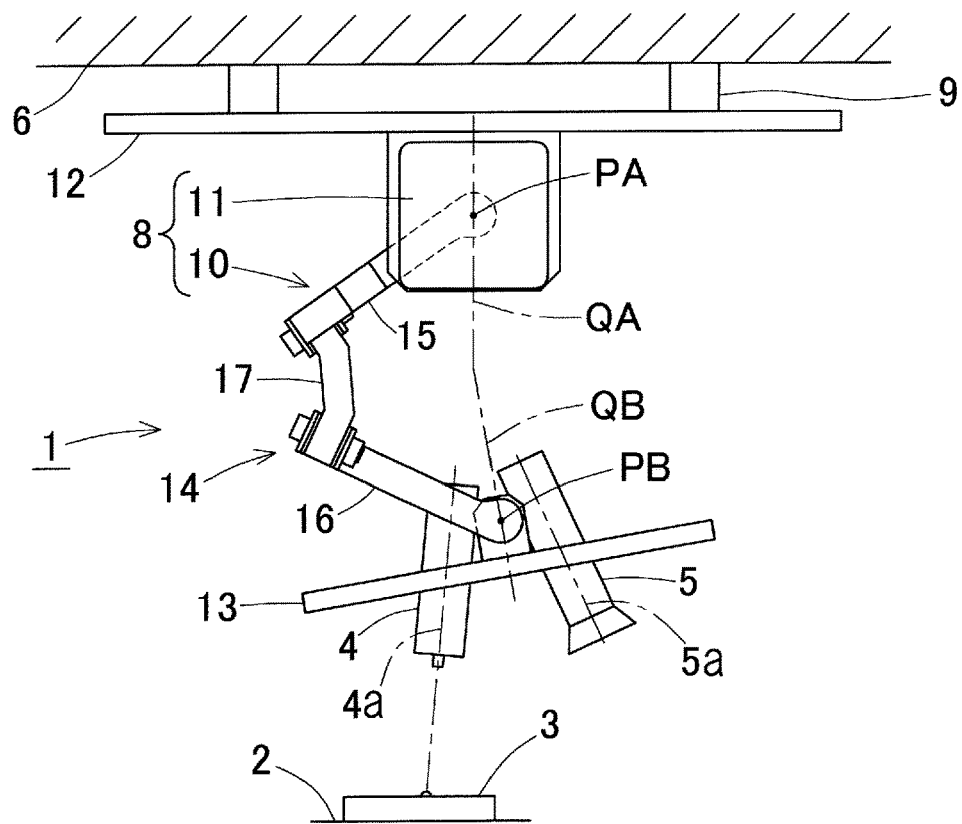
FIG. 10 is a front view of the working device in another state, with a portion thereof being omitted.
Figure 11:
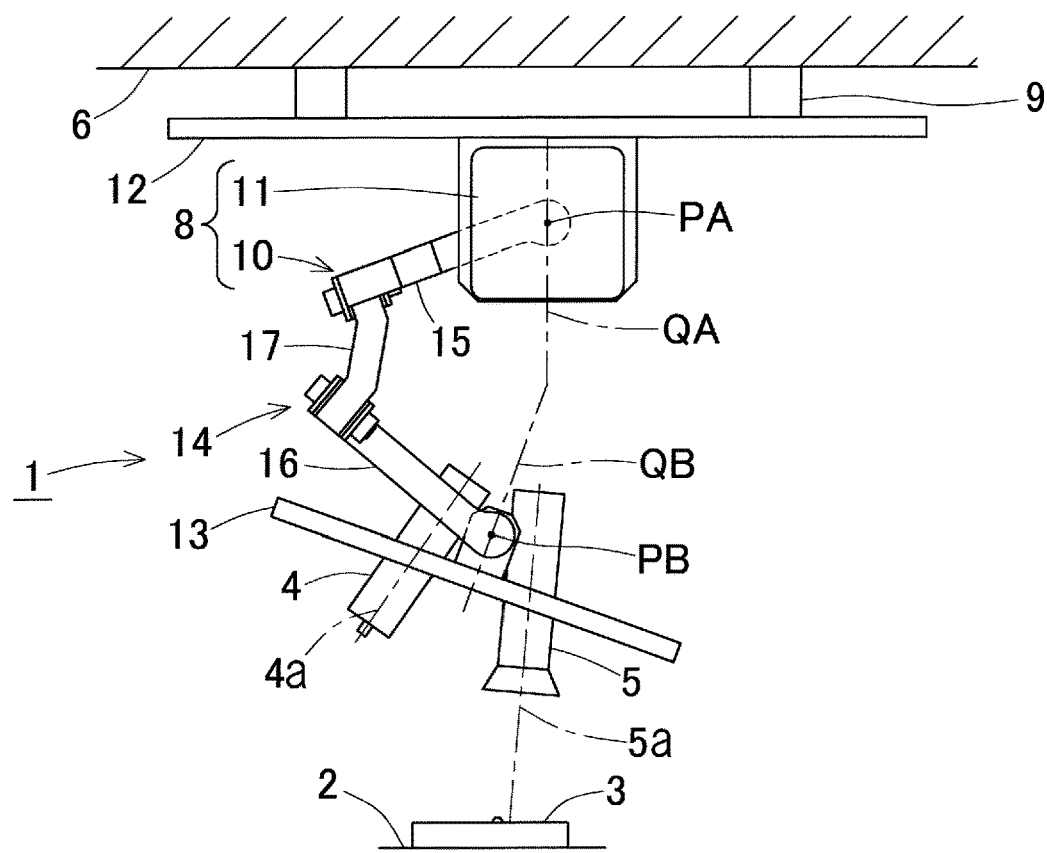
FIG. 11 is a front view of the working device in still another state, with a portion thereof being omitted.

In a working device 1 according to a third embodiment shown in FIG. 9, FIG. 10, and FIG. 11, the main end effector 4 and the sub end effector 5 are mounted to the distal-end-side link hub 13 such that the axes 4*a* and 5*a* of the distal ends thereof form an angle therebetween. However, neither of the axes 4*a* and 5*a* coincide with the axis QB of the distal-end-side link hub 13. In addition, regardless of the posture of the parallel link mechanism 10, neither of the axes 4*a* and 5*a* coincide with the axis QA of the proximal-end-side link hub 12. Furthermore, no linear motion mechanism is provided, and the proximal-end-side link hub 12 of the parallel link mechanism 10 is mounted to the support member 6 via the mounting member 9. The other components are the same as those in the first embodiment shown in FIG. 1 and FIG. 2.

FIG. 9 shows a state where the parallel link mechanism 10 is located at an origin position, FIG. 10 shows a state where a work is being performed by the main end effector 4, and FIG. 11 shows a state where a work is being performed by the sub end effector 5. With this configuration, the operations and effects as in the above-described (1) and (2) are obtained.

Figure 12:
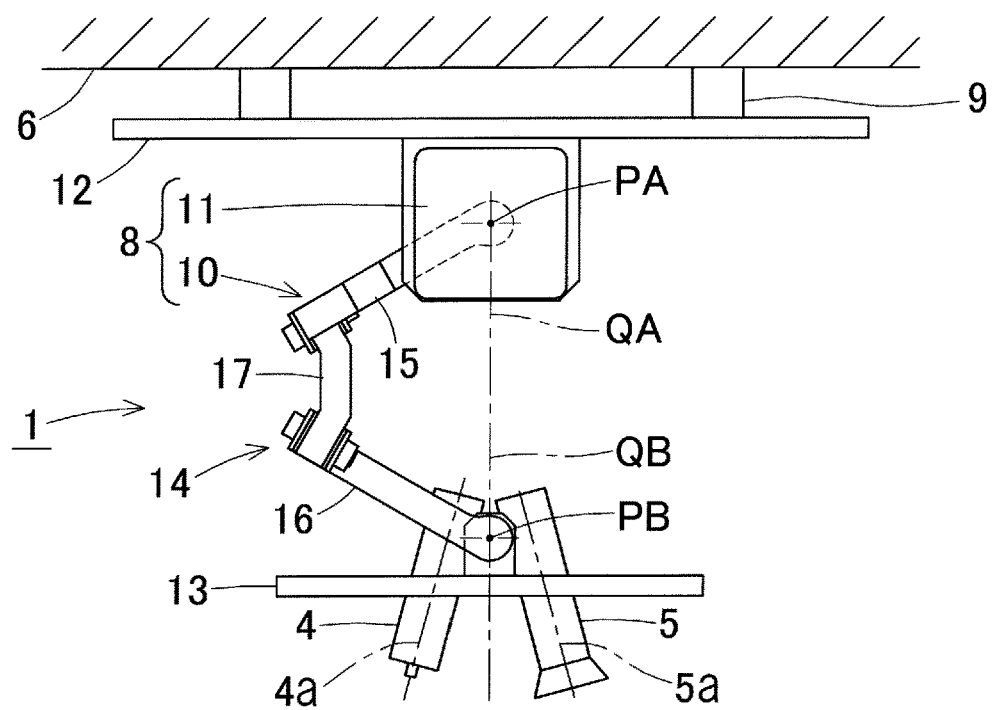
FIG. 12 is a front view of a working device using a parallel link mechanism according to a fourth embodiment of the present invention in one state, with a portion thereof being omitted.
Figure 13:
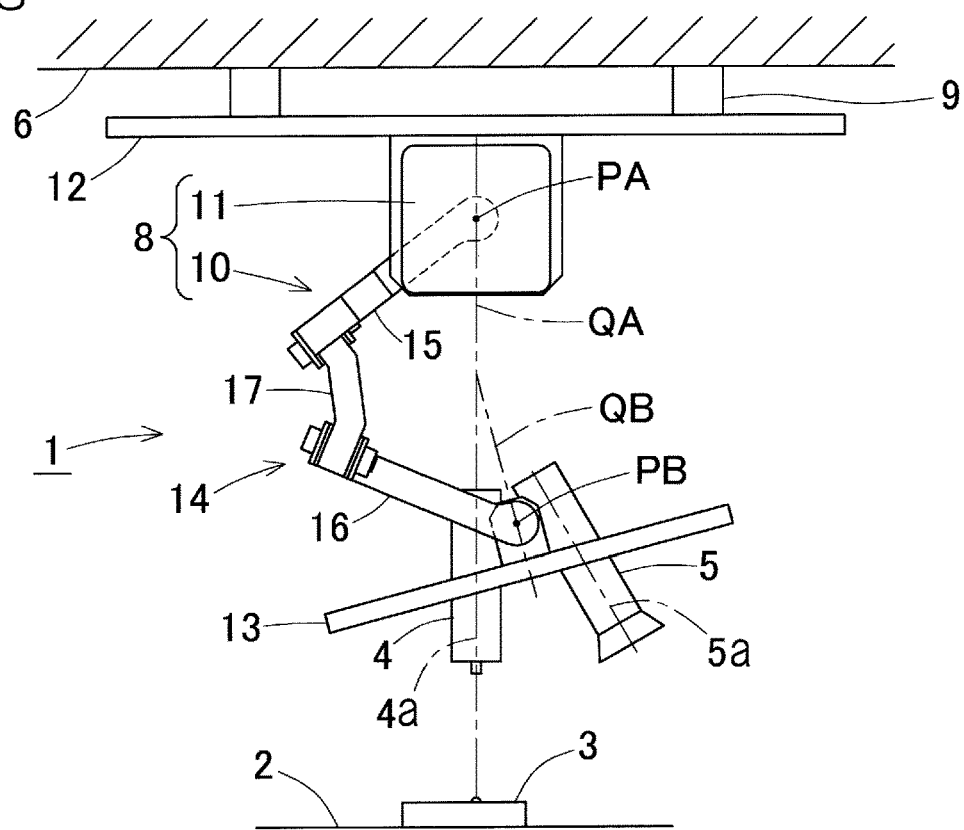
FIG. 13 is a front view of the working device in another state, with a portion thereof being omitted.
Figure 14:
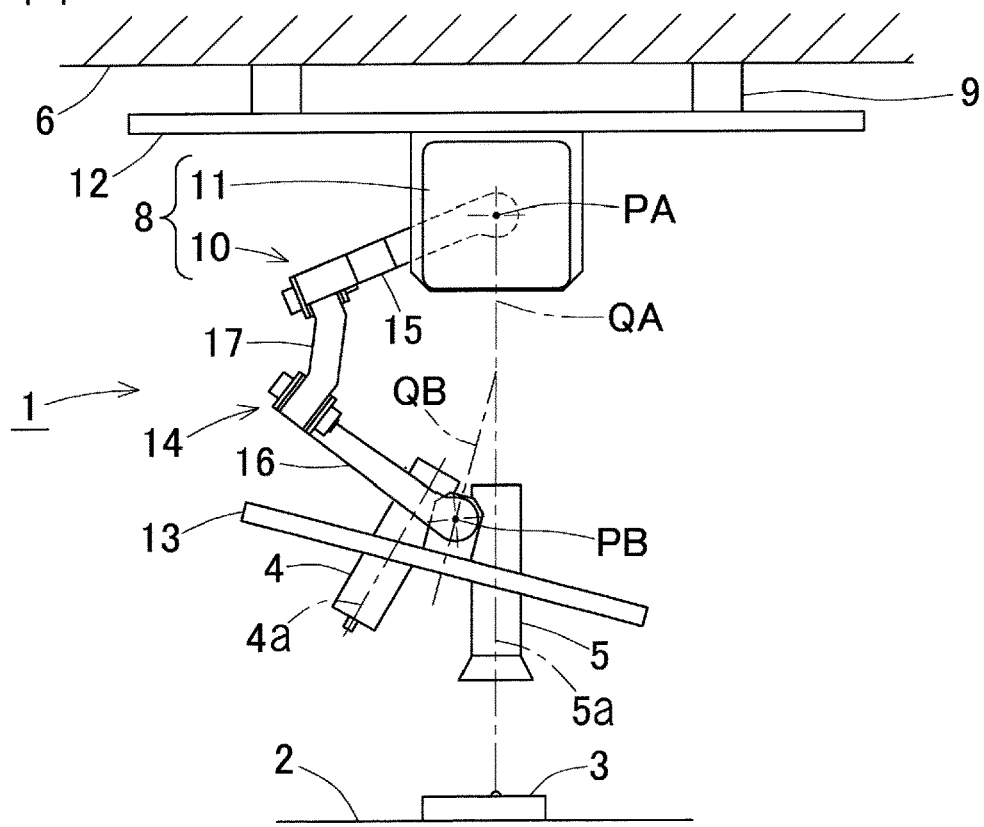
FIG. 14 is a front view of the working device in still another state, with a portion thereof being omitted.

Similarly to the third embodiment shown in FIG. 9 to FIG. 11, in a working device 1 according to a fourth embodiment shown in FIG. 12, FIG. 13 and FIG. 14, the main end effector 4 and the sub end effector 5 are mounted to the distal-end-side link hub 13 such that the axes 4*a* and 5*a* of the distal ends thereof form an angle therebetween, and neither of the axes 4*a* and 5*a* coincide with the axis QB of the distal-end-side link hub 13. The fourth embodiment is different from the third embodiment shown in FIG. 9 to FIG. 11 in that each of the main end effector 4 and the sub end effector 5 is mounted such that the axis 4*a*, 5*a* of the distal end thereof coincides with the axis QA of the proximal-end-side link hub 12 in a state where the parallel link mechanism 10 has a predetermined posture. The other components are the same as those in the third embodiment shown in FIG. 9 to FIG. 11.

FIG. 12 shows a state where the parallel link mechanism 10 is located at an origin position, FIG. 13 shows a state where a work is being performed by the main end effector 4, and FIG. 14 shows a state where a work is being performed by the sub end effector 5. In the state shown in FIG. 13, the axis 4*a* of the distal end of the main end effector 4 coincides with the axis QA of the proximal-end-side link hub 12. In addition, in the state shown in FIG. 14, the axis 5*a* of the distal end of the sub end effector 5 coincides with the axis QA of the proximal-end-side link hub 12. With this configuration, the operations and effects as in the above-described (1), (2) and (3) are obtained.

Figure 15:
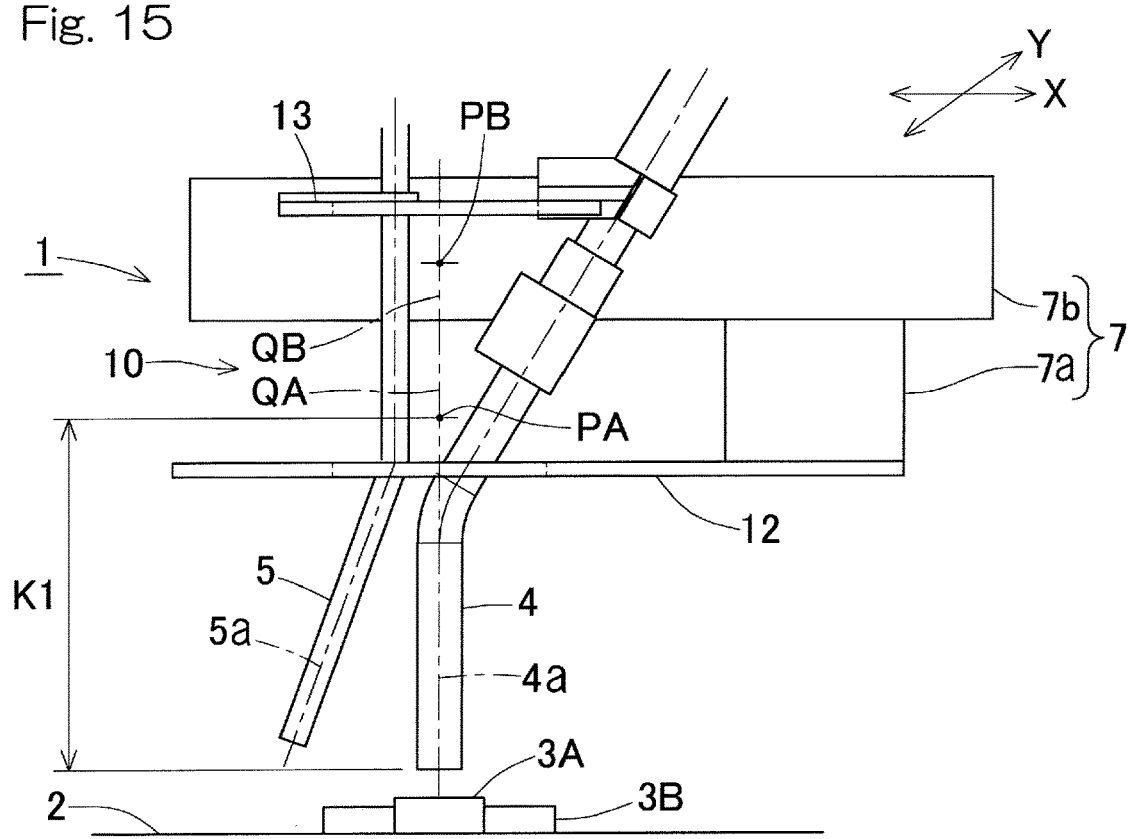
FIG. 15 is a front view of a working device using a parallel link mechanism according to a fifth embodiment of the present invention in one state, with a portion thereof being omitted.
Figure 16:
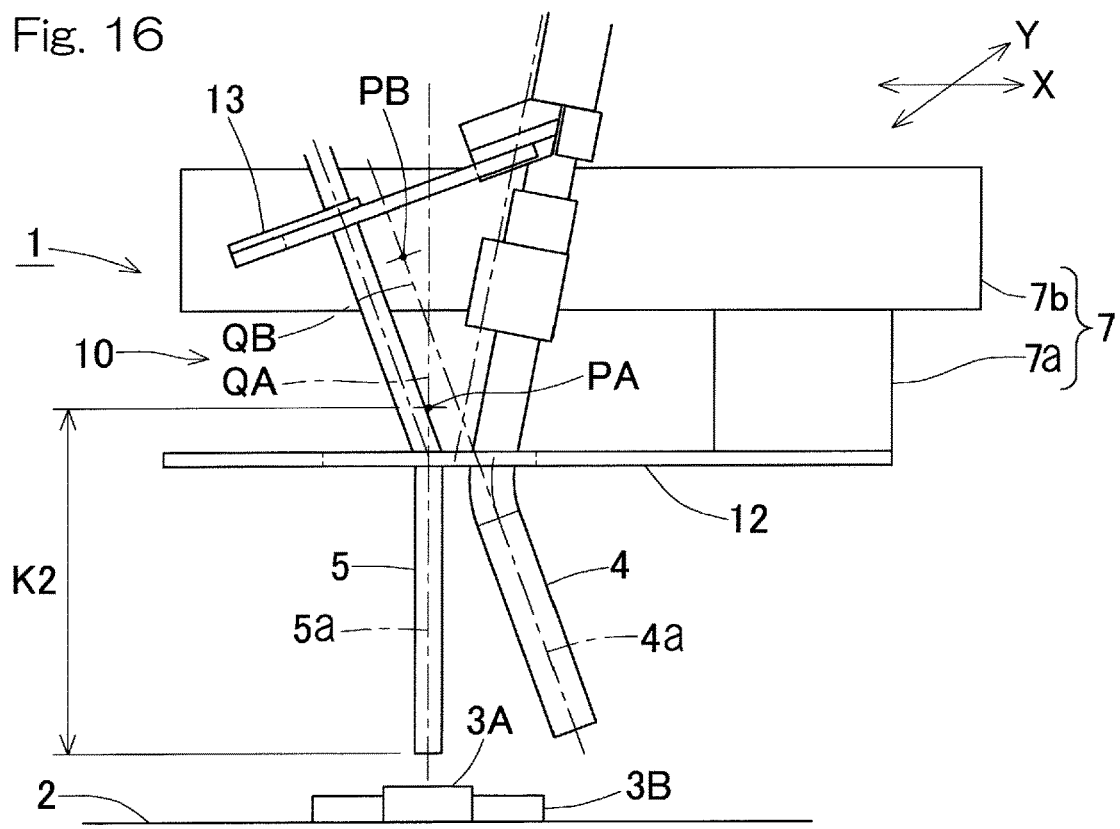
FIG. 16 is a front view of the working device in another state, with a portion thereof being omitted.

FIG. 15 and FIG. 16 show a working device according to a fifth embodiment configured as an automatic welding machine. The main end effector 4 is a welding torch of the welding machine, and the sub end effector 5 is a heating device. This working device 1 includes the linear motion mechanism 7 with orthogonal two axes composed of the X-axis linear motion actuator 7*b* and the Y-axis linear motion actuator 7*a*, and the proximal-end-side link hub 12 of the parallel link mechanism 10 is mounted to an advancing/retreating portion of the Y-axis linear motion actuator 7*a* of the linear motion mechanism 7. The link mechanism of this parallel link mechanism 10 are not shown, since it is identical with that of FIG. 3. In the fifth embodiment, the parallel link mechanism 10 is disposed such that the proximal-end-side link hub 12 is located on the lower side and the distal-end-side link hub 13 is located on the upper side, contrary to those of the first to fourth embodiments.

Even in the case where the order in the parallel link mechanism 10 is reversed relative to the first embodiment shown in FIG. 1 and FIG. 2, the main end effector 4, implemented by the welding torch, and the sub end effector 5, implemented by the heating device, are mounted to the distal-end-side link hub 13, similarly to the first embodiment in FIG. 1 and FIG. 2. The important points will be described below although being repeated.

The axis 4*a* of the distal end of the main end effector 4 coincides with the axis QB of the distal-end-side link hub 13.

The axis 5*a* of the distal end of the sub end effector 5 and the axis 4*a* of the distal end of the main end effector 4 form an angle therebetween, that is, intersect with each other at an arbitrary degree angle.

In a state where the parallel link mechanism 10 has a predetermined posture as in FIG. 16, the axis 5*a* of the distal end of the sub end effector 5 coincides with the axis QA of the proximal-end-side link hub 12.

The relationship between the distance K1 (FIG. 15) and the distance K2 (FIG. 16) satisfies K2≤K1.

In the working device 1 according to the fifth embodiment shown in FIG. 15 and FIG. 16 configured as an automatic welding machine, the welding torch (main end effector 4) and the heating device (sub end effector 5) are mounted to the distal-end-side link hub 13, and thus the following operations can be performed: in order to inhibit rapid change in the temperature of the workpiece 3 from occurring between before and after welding, the heating device performs heating before welding, the welding torch performs welding, and the heating device performs heating after the welding. In this case, switching between the heating device and the welding torch can be swiftly performed through only the motion of the parallel link mechanism 10, whereby reduction in the temperature at the time of the switching can be prevented, and efficient heating can be achieved. In addition, since the welding torch (main end effector 4) and the heating device (sub end effector 5) are mounted to the distal-end-side link hub 13 as described above, the operations and effects as in the above-described (1) to (5) are obtained.

Figure 17A:
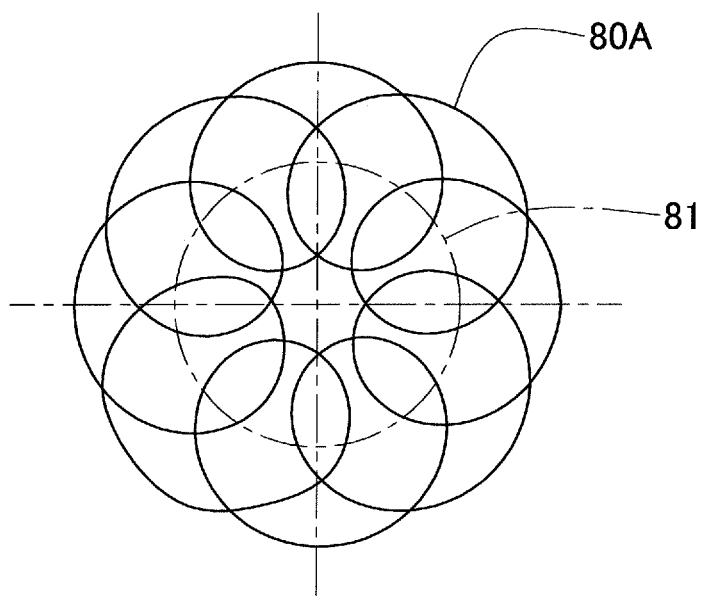
FIG. 17A is a diagram showing one example of a welding track including a weaving-motion.
Figure 17B:
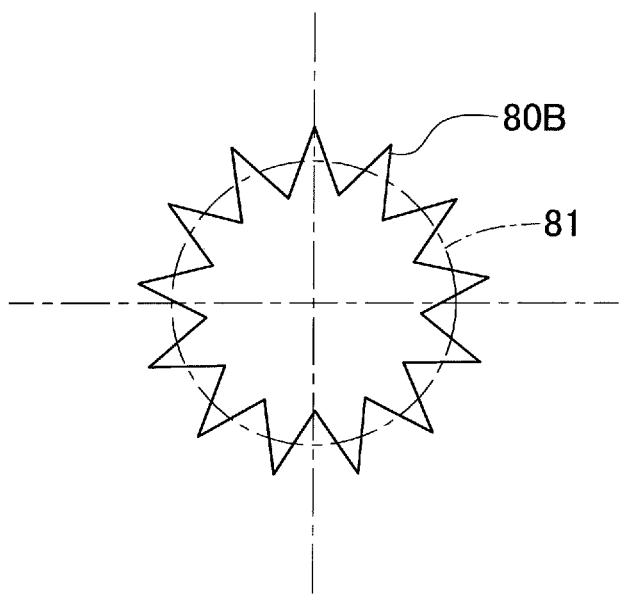
FIG. 17B is a diagram showing another example of the welding track including the weaving-motion.

When welding is performed, the link actuation device 8 is moved in the X-axis direction and the Y-axis direction by the linear motion mechanism 7, and simultaneously, while the posture of the distal-end-side link hub 13 relative to the proximal-end-side link hub 12 is changed by operating the link actuation device 8, the welding torch (main end effector 4) mounted to the distal-end-side link hub 13 performs a welding on workpieces 3A and 3B. Accordingly, the welding can be performed with welding tracks 80A and 80B as shown in FIGS. 17A and 17B, for example. In the welding with the welding track 80A as in FIG. 17A, the welding torch performs a weaving motion so as to advance in the advancement direction while drawing circles relative to a reference line 81 located in the vicinity of a desired welding position. In the welding with the welding track 80B as in FIG. 17B, the welding torch performs a weaving motion so as to advance in the advancement direction while drawing waves relative to the reference line 81 located in the vicinity of the desired welding position.

In the case of the welding with the welding track 80A as in FIG. 17A, a motion along the reference line 81 is performed with the linear motion mechanism 7, and a motion of drawing circles is performed with the link actuation device 8. Since the motion along the reference line 81 and the motion of drawing circles are respectively performed with separate mechanisms in this manner, both motions are easily controlled at the same time. In this example, the reference line 81 is a circle, but, also with another reference line, the weaving motion can be performed while circles are being drawn. If such a weaving motion, in which circles are drawn, is performed, the direction of the track is continuously changed, and thus, no rapid change in the movement speed occurs, whereby a smooth weaving motion can be performed at high speed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . working device
3, 3A, 3B . . . workpiece
4 . . . main end effector
4*a* . . . axis of distal end of main end effector
5 . . . sub end effector
5*a* . . . axis of distal end of sub end effector
7 . . . linear motion mechanism
7*a* . . . Y-axis linear motion actuator
7*b* . . . X-axis linear motion actuator
10 . . . parallel link mechanism
11 . . . posture-controlling actuator
12 . . . proximal-end-side link hub
13 . . . distal-end-side link hub
14 . . . link mechanism
15 . . . proximal-side end link member
16 . . . distal-side end link member
17 . . . center link member
K1 . . . distance from proximal-end-side spherical link center to distal end of main end effector
K2 . . . distance from proximal-end-side spherical link center to distal end of sub end effector
O1 . . . axis of revolute pair between proximal-end-side link hub and proximal-side end link member
O2 . . . axis of revolute pair between proximal-side end link member and center link member
PA . . . proximal-end-side spherical link center
PB . . . distal-end-side spherical link center
QA . . . axis of proximal-end-side link hub
QB . . . axis of distal-end-side link hub

What is claimed is:

1. A working device using a parallel link mechanism, the working device being configured to perform a work on a workpiece with use of end effectors,
the working device comprising:
a parallel link mechanism by which the end effectors are supported so as to be changeable in posture; and
posture-controlling actuators configured to actuate the parallel link mechanism, wherein
the parallel link mechanism includes:
a proximal-end-side link hub;
a distal-end-side link hub; and
three or more link mechanisms which are disposed between the proximal-end-side link hub and the distal-end-side link hub, and by which the distal-end-side link hub is connected to the proximal-end-side link hub so that the posture of the distal-end-side link hub relative to the proximal-end-side link hub can be changed,
each link mechanism includes:
a proximal-side end link member having one end rotatably connected to the proximal-end-side link hub;
a distal-side end link member having one end rotatably connected to the distal-end-side link hub; and
a center link member having opposite ends rotatably connected to other ends of the proximal-side and distal-side end link members, respectively,
the posture-controlling actuators are provided to two or more link mechanisms among the three or more link mechanisms, the posture-controlling actuators being configured to arbitrarily change the posture of the distal-end-side link hub relative to the proximal-end-side link hub,
the end effectors are mounted to the distal-end-side link hub and include one main end effector configured to perform a main work on the workpiece and one or a plurality of sub end effectors configured to perform an auxiliary work on the workpiece, and
switching between a state where a work is performed by the main end effector and a state where a work is performed by the one or a plurality of sub end effectors,
wherein when the main end effector performs the work on the workpiece, an axis of a distal end of the main end effector is located at a non-perpendicular angle to a central vertical axis of the workpiece and at a non-perpendicular angle to an axis of a distal end of the one or a plurality of sub end effectors.

2. The working device using the parallel link mechanism as claimed in claim 1, wherein
the main end effector and each sub end effector are mounted to the distal-end-side link hub, such that the axis of the distal end of the main end effector intersects with an axis of a distal end of each sub end effector at an arbitrary degree angle.

3. The working device using the parallel link mechanism as claimed in claim 1, wherein
in a case where:
a point, at which an axis of a revolute pair between the proximal-end-side link hub and each proximal-side end link member intersects with an axis of a revolute pair between the proximal-side end link member and the corresponding center link member, is referred to as a proximal-end-side spherical link center; and
a straight line that passes the proximal-end-side spherical link center and that intersects, at a right angle, with the axis of the revolute pair between the proximal-end-side link hub and the proximal-side end link member, is referred to as an axis of the proximal-end-side link hub,
each of the main end effector and the sub end effector is mounted to the distal-end-side link hub, such that an axis of a distal end of the each end effector coincides with the axis of the proximal-end-side link hub in a state where the distal-end-side link hub has a predetermined posture relative to the proximal-end-side link hub.

4. The working device using the parallel link mechanism as claimed in claim 1, wherein
in a case where:
   a point, at which an axis of a revolute pair between the distal-end-side link hub and each distal-side end link member intersects with an axis of a revolute pair between the distal-side end link member and the corresponding center link member, is referred to as a distal-end-side spherical link center; and
   a straight line that passes the distal-end-side spherical link center and that intersects, at the right angle, with the axis of the revolute pair between the distal-end-side link hub and the distal-side end link member, is referred to as an axis of the distal-end-side link hub,
the axis of the distal end of the main end effector coincides with the axis of the distal-end-side link hub.

5. The working device using the parallel link mechanism as claimed in claim 1, wherein
in a case where:
   the point, at which an axis of a revolute pair between the proximal-end-side link hub and each proximal-side end link member intersects with an axis of a revolute pair between the proximal-side end link member and the corresponding center link member, is referred to as the proximal-end-side spherical link center;
   a straight line that passes the proximal-end-side spherical link center and that intersects, at the right angle, with the axis of the revolute pair between the proximal-end-side link hub and the proximal-side end link member, is referred to as the axis of the proximal-end-side link hub,
   a point, at which the axis of the revolute pair between the distal-end-side link hub and each distal-side end link member intersects with an axis of a revolute pair between the distal-side end link member and the corresponding center link member, is referred to as the distal-end-side spherical link center; and
   the straight line that passes the distal-end-side spherical link center and that intersects, at the right angle, with the axis of the revolute pair between the distal-end-side link hub and the distal-side end link member, is referred to as an axis of the distal-end-side link hub,
a distance from the proximal-end-side spherical link center to the distal end of the sub end effector, in a state where the axis of the distal end of the sub end effector and the axis of the proximal-end-side link hub coincide with each other, is equal to or shorter than a distance from the proximal-end-side spherical link center to the distal end of the main end effector in a state where the axis of the proximal-end-side link hub and the axis of the distal-end-side link hub coincide with each other.

6. The working device using the parallel link mechanism as claimed in claim 1, wherein
the proximal-end-side link hub is mounted to a linear motion mechanism including a linear motion actuator with one or more axes.

7. The working device using the parallel link mechanism as claimed in claim 1, wherein
the main end effector is a welding torch, and the sub end effector is a heating device.

* * * * *